United States Patent
Kanehira et al.

(10) Patent No.: US 9,571,797 B2
(45) Date of Patent: Feb. 14, 2017

(54) NETWORK EQUIPMENT, NETWORK SYSTEM AND SURVEILLANCE CAMERA SYSTEM

(75) Inventors: Yusuke Kanehira, Kanagawa (JP); Hideto Takeuchi, Tokyo (JP)

(73) Assignee: Sony Corporation (JP)

( * ) Notice: Subject to any disclaimer, the term of this patent is extended or adjusted under 35 U.S.C. 154(b) by 1449 days.

(21) Appl. No.: 12/011,583

(22) Filed: Jan. 28, 2008

(65) Prior Publication Data

US 2008/0180525 A1    Jul. 31, 2008

(30) Foreign Application Priority Data

Jan. 29, 2007    (JP) ................................ P2007-017489

(51) Int. Cl.
- *H04N 7/18* (2006.01)
- *G06K 9/00* (2006.01)
- *G06K 9/32* (2006.01)

(52) U.S. Cl.
CPC .......... *H04N 7/181* (2013.01); *G06K 9/00771* (2013.01); *G06K 9/32* (2013.01)

(58) Field of Classification Search
CPC ....... H04N 7/181; G06K 9/00771; G06K 9/32
USPC ................. 348/143, 152, 154, 155
See application file for complete search history.

(56) References Cited

U.S. PATENT DOCUMENTS

| | | | | |
|---|---|---|---|---|
| 2004/0075738 A1* | 4/2004 | Burke | .............. | G08B 13/19656 348/143 |
| 2007/0024707 A1* | 2/2007 | Brodsky | ............ | G08B 13/1961 348/143 |

FOREIGN PATENT DOCUMENTS

| | | |
|---|---|---|
| JP | 3-156597 A | 7/1991 |
| JP | 10-174091 A | 6/1998 |
| JP | 2001-006078 A | 1/2001 |
| JP | 2002-165210 A | 6/2002 |
| JP | 2004-248090 A | 9/2004 |
| JP | 2005-027120 A | 1/2005 |
| JP | 2006-013888 A | 1/2006 |
| JP | 2006-080596 A | 3/2006 |

* cited by examiner

*Primary Examiner* — Andy Rao
*Assistant Examiner* — Joel Mesa
(74) *Attorney, Agent, or Firm* — Lerner, David, Littenberg, Krumholz & Mentlik, LLP

(57) ABSTRACT

Network equipment which is connected to other network equipment through a network is disclosed. The equipment includes: a detection unit processing picture data and detecting a moving object and a non-moving object; a metadata generation unit generating metadata including information indicating detection statuses of the detection unit and information concerning the moving object and the non-moving object detected in the detection unit; and a data transmission unit transmitting the picture data and the metadata generated in the metadata generation unit to the other network equipment.

21 Claims, 14 Drawing Sheets

FIG. 2

METADATA EXAMPLE
(ONE FRAME)

| TIME INFORMATION | |
| --- | --- |
| | TIME |
| | FRAME COUNT |
| POSITION INFORMATION | |
| | Pan |
| | Tilt |
| | Zoom |
| DETECTION INFORMATION | | |
| | DETECTION STATUS | |
| | THE NUMBER OF OBJECTS | |
| | OBJECT 1 | OBJECT CLASS |
| | | COORDINATES |
| | | DIFFERENCE VALUE |
| | | DETECTED TIME |
| | OBJECT 2 | OBJECT CLASS |
| | | COORDINATES |
| | | DIFFERENCE VALUE |
| | | DETECTED TIME |
| | | ⋮ |

WHEN OBJECT DOES NOT EXIST

WHEN OBJECT EXISTS

WHEN THERE IS SWAY

PICTURE DATA

DETECTION INFORMATION

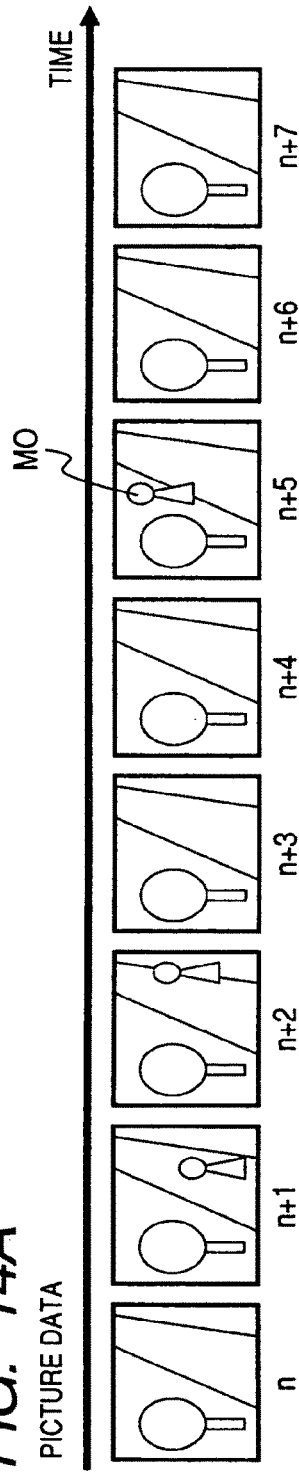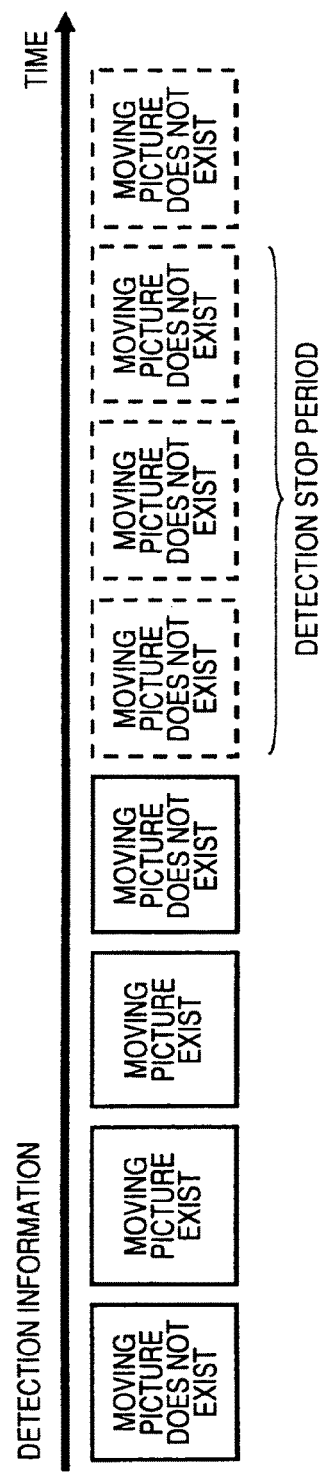

NETWORK EQUIPMENT, NETWORK SYSTEM AND SURVEILLANCE CAMERA SYSTEM

CROSS-REFERENCE TO RELATED APPLICATIONS

The present application claims priority from Japanese Patent Application No. JP 2007-017489 filed in the Japanese Patent Office on Jan. 29, 2007, the entire content of which is incorporated herein by reference.

BACKGROUND OF THE INVENTION

1. Field of the Invention

The invention relates to network equipment, a network system and a surveillance camera system. Particularly, the invention relates to network equipment and the like allowing other network equipment to recognize detection statuses of a detection unit by including information indicating the detection statuses of the detection unit in metadata to be transmitted to other network equipment with picture data, in addition to information concerning a moving object or a non-moving object detected in the detection unit.

2. Description of the Related Art

As a surveillance camera system, there is one in which a surveillance camera (network camera) is connected to a recording apparatus through a network and picture data obtained by taking surveillance pictures is transmitted from the surveillance camera to the recording apparatus through the network to be recorded therein (for example, refer to JP-A-2006-80596 (Patent Document 1)). It is considered that, in such kind of surveillance camera system, the surveillance camera further has functions such as detection of a moving object, detection of a non-moving object, transmitting metadata including detection information from the surveillance camera to the recording apparatus to be recorded therein with picture data.

SUMMARY OF THE INVENTION

Detection information transmitted from the surveillance camera to the recording apparatus as described above is in the same state as a case in which a moving object or a non-moving picture was not detected during, for example, a period when detection of the moving object or the non-moving object is stopped due to abnormality of equipment and so on. In this case, when searching a period when a moving object or a non-moving object exists from picture data recorded in the recording apparatus based on the detected information, the detection information is in the same state as the case in which a moving object or a non-moving picture does not exist during the period when detection of the moving picture or the non-moving picture is stopped, even in the period when a moving object or a non-moving object actually exists, therefore, it is difficult to perform accurate searching.

FIG. 14A and FIG. 14B are views showing an example of picture data and detection information of moving objects transmitted from the surveillance camera to the recording apparatus to be recorded in related arts.

In the nth frame, a moving object is not detected by moving object detection, and detection information indicating that a moving object does not exist is transmitted from the surveillance camera to the recording apparatus to be recorded therein. In the n+1th frame, a moving object is detected by moving object detection and detection information indicating that the moving object exists is transmitted from the surveillance camera to the recording apparatus to be recorded therein. In the n+2th frame, a moving object is detected by moving object detection and detection information indicating that the moving object exists is transmitted from the surveillance camera to the recording apparatus to be recorded therein.

In the n+3th frame, a moving object is not detected by moving object detection, and detection information indicating that a moving object does not exist is transmitted from the surveillance camera to the recording apparatus to be recorded therein. In the n+4th frame to the n+6th frame, a moving object is not detected since the moving object detection is stopped due to some reason and the detection information is the same as the n+3th frame, therefore, detection information is not transmitted from the surveillance camera to the recording apparatus. In the n+7th frame, the moving object detection is started again, however, a moving object is not detected by moving object detection and detection information is the same as n+3th frame, therefore, detection information is not transmitted from the surveillance camera to the recording apparatus.

In FIGS. 14A and 14B, detection information which is transmitted is shown by solid lines and detection information which is not transmitted is shown by dashed lines.

As shown in the drawing, since detection information is the same in the n+4th frame to the n+6th frame during which moving object detection is stopped, for example, even in the case that a moving object MO exists in the n+5th frame, it is not possible to search a period in which the moving object MO exists (the n+5th frame) from the detection information.

It is desirable to allow the second network equipment to which picture data and metadata are transmitted from the first network equipment to recognize the detection status of the detection unit for the moving object or the non-moving object in the first network.

The concept of the invention is directed to a network system in which first network equipment and second network equipment are connected through a network, in which the first network equipment includes a detection unit processing picture data and detecting a moving object or a non-moving object, a metadata generation unit generating metadata including information indicating detection statuses of the detection unit and information concerning the moving object or the non-moving object detected in the detection unit, and a data transmission unit transmitting the picture data and metadata generated in the metadata generation unit to the second network equipment, and in which the second network equipment includes a data receiving unit receiving picture data and metadata transmitted from the first network equipment, and a data recording unit recording picture data and metadata received in the data receiving unit.

In an embodiment of the invention, the first network equipment such as a surveillance camera and a camera server is connected to the second network equipment such as a surveillance apparatus (computer) and a recording unit (recorder) through a network.

In the first network equipment, the detection unit processes picture data and detects a moving object or a non-moving object. In the detection unit, for example, detection operation of a moving object or a non-moving object is performed in each frame. In the case that the first network equipment is a surveillance camera, picture data to be processed is picture data corresponding to surveillance pictures obtained by taking pictures. The picture data and metadata are transmitted from the first network equipment to the second network equipment.

The metadata includes information indicating detection statuses of the detection unit and information concerning a moving object or non-moving object detected in the detection unit. The information indicating the detection statuses of the detection unit are, for example, during detection, during acquiring a background, during PTZ (Pan, Tilt and Zoom) operation, video abnormality, an equipment abnormality and the like. For example, when the detection status of the detection unit is during detection, detection of a moving object or a non-moving object is performed, however, when the detection status is in other statuses, detection of a moving object or a non-moving object is not performed, and the detection status is in the state of during detection stop.

In the second network equipment, picture data and metadata transmitted from the first network equipment are received and recorded. Since information indicating the detection statuses of the detection unit is included in the metadata, the second network equipment can know the detection status in the detection unit of the first network equipment easily.

In the embodiment of the invention, it is preferable that processing of using information indicating the detection statuses of the detection unit is performed in, for example, the second equipment. For example, in the second equipment, picture data corresponding to a period during which the detection unit stops the detection is processed, and processing of detecting a moving object or a non-moving object is performed by using information indicating detection statuses of the detection unit. Also in the second network equipment, processing of displaying detection statuses of the detection unit is performed so as to correspond to pictures according to picture data by using information indicating detection statuses of the detection unit.

According to the embodiment of the invention, metadata transmitted to other network equipment with picture data is allowed to include information indicating detection statuses of the detection unit in addition to information concerning a moving object and a non-moving object detected in the detection unit, which allows the other network equipment to recognize the detection statuses of the detection unit and to use the statuses for processing after that.

BRIEF DESCRIPTION OF THE DRAWINGS

FIG. 2 is a chart showing one frame of metadata which is generated in a surveillance camera and transmitted to a surveillance apparatus;

FIG. 14A and FIG. 14B are block diagrams showing examples of picture data and detection information of a moving object which are transmitted from a surveillance camera to a surveillance apparatus and recorded therein in related arts.

DESCRIPTION OF THE PREFERRED EMBODIMENTS

Hereinafter, embodiments of the invention will be explained with reference to the drawings.

Figure 1:
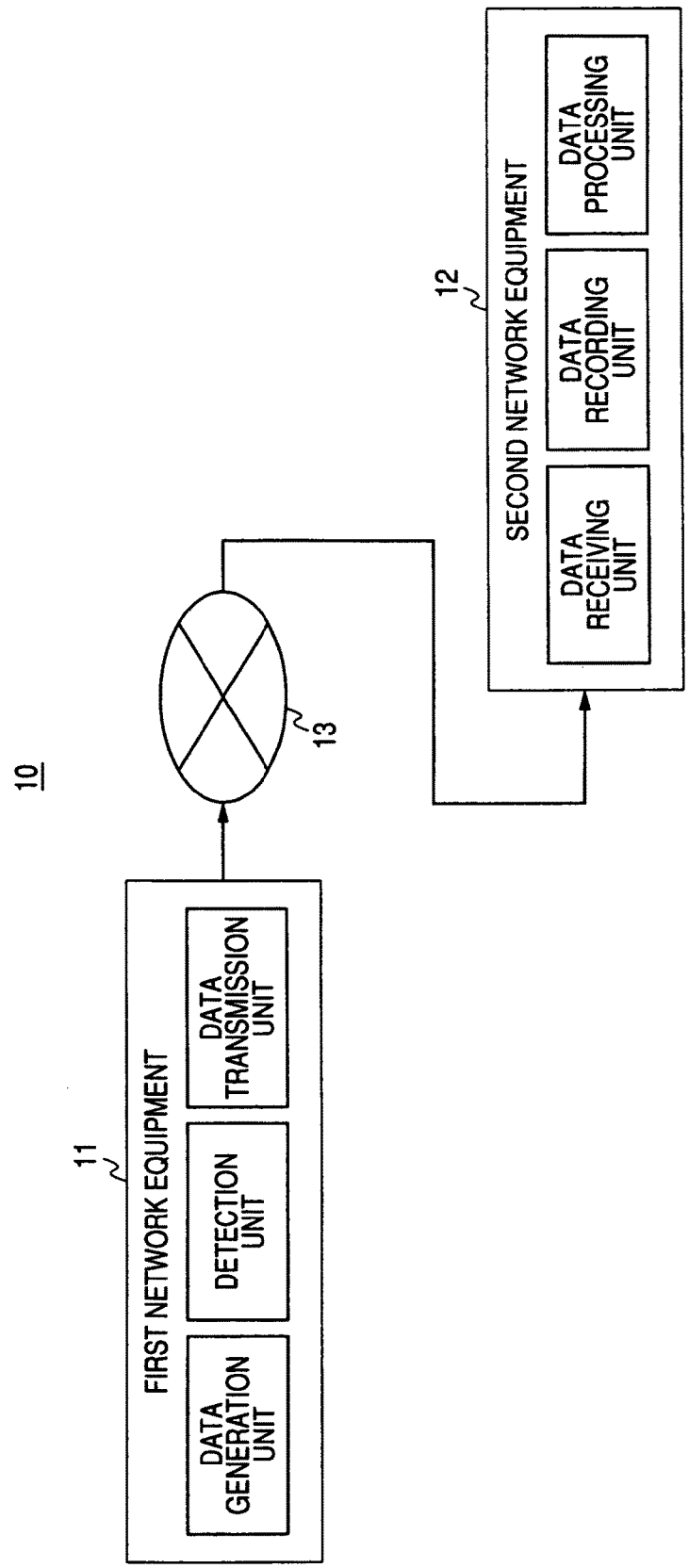
FIG. 1 is a block diagram showing a network system in which first network equipment and second network equipment are connected through a network.

FIG. 1 is a network system 10 in which first network equipment 11 and second network equipment 12 are connected through a network 13. The first network equipment 11 is, for example, a surveillance camera, a camera server or the like. The second network equipment 12 is, for example, a surveillance apparatus (computer), a recording apparatus (recorder) or the like.

The first network equipment 11 includes a detection unit detecting a moving object and a non-moving object. The detection unit processes picture data, detecting a moving object or a non-moving object. In this case, the detection unit performs detection operation of a moving object or a non-moving object in each frame. For example, when the first network equipment 11 is imaging equipment such as a surveillance camera, the first network equipment 11 processes picture data taken and generated by itself to detect a moving object or non-moving object. In this case, the first network equipment 11 includes a data generation unit. For example, when the first network equipment 11 is recording equipment such as a camera server, the first network equipment 11 processes picture data supplied from other equipment or picture data played back from recording media by itself to detect a moving object or a non-moving object.

The first network equipment includes a metadata generation unit generating metadata including detection information (information indicating detection statuses of the detection unit and information concerning a moving object or a non-moving object detected in the detection unit). FIG. 2 shows one frame of metadata, which is generated in a later-described surveillance camera and transmitted to the surveillance apparatus. The metadata includes time information, position information and detection information.

The time information includes time and frame count. The time means hours, minutes and seconds for indicating the present time, and the frame count means the frame number counted from activation of the surveillance camera. The position information includes a pan position, a tilt position and zoom magnification. The detection information includes a detection status, the object number and object information.

The detection status has information indicating detection statuses of the detection unit. The detection status includes during detection (0x01), during acquiring a background (0x02), during PTZ (Pan, Tilt, Zoom) operation (0x03), video abnormality (0x04), equipment abnormality (0x05) and the like. The detection unit detects a moving object or a non-moving object during detection state, however, the unit does not detect a moving object or a non-moving object in other statuses, and will be in the state of detection stop.

The object number is the number of detected moving objects or non-moving objects. The object information exists as same as the number of objects. The object information includes information concerning a moving object or a non-moving object detected in the detection unit. When the number of object is "0", the object information does not exist. The case in which the number of objects is "0" corresponds to a case in which a moving object or a non-moving object was not detected though detection was performed in the detection unit when the detection status is during detection (0x01), or a case in which detection was not performed in the detection unit when the detection status is in a status other than during detection.

The object information includes an object class, coordinates, a difference value and a detection time. The object class is information indicating whether moving-object detection or non-moving object detection. The coordinates are coordinates indicating a position of the detected moving object or non-moving object. The difference value is the difference in a pixel level between the detected moving object or non-moving object and background. The detected time is the time when the detected moving object or non-moving object was first detected. The existence time of the moving object or non-moving object can be calculated by the detected time.

The first network equipment 11 includes a data transmission unit transmitting picture data and metadata to the second network equipment 12. The data transmission unit transmits metadata as shown in FIG. 2 so as to correspond to respective frames of picture data. However, with respect to frames in which respective information included in detection information does not vary, the data transmission unit does not transmit the metadata to reduce transmission capacity. For example, when frames in which a moving object or non-moving object is not detected continue, transmission of metadata is performed only at the first frame. In addition, when frames in a given detection status other than during detection continue, transmission of metadata is performed only at the first frame.

The second network equipment 12 includes a data receiving unit receiving picture data and metadata transmitted from the first network equipment 11 and a data recording unit recording the received picture data and metadata. As described above, metadata transmitted corresponding to respective frames of picture data includes the detection status including information indicating detection statuses of the detection unit, therefore, the second network equipment 12 can recognize the detection status in the detection unit of the first network equipment 11.

The second network equipment 12 includes a data processing unit performing processing using the detection status (information indicating detection statuses of the detection unit). For example, the data processing unit processes picture data corresponding to picture data in periods during which detection is stopped by the detection unit, using the detection status, thereby performing processing of detecting a moving object of a non-moving object. In addition, for example, the data processing unit performs processing of displaying the detection status of the detection unit so as to correspond to pictures according to picture data by using the detection status.

Figure 3:
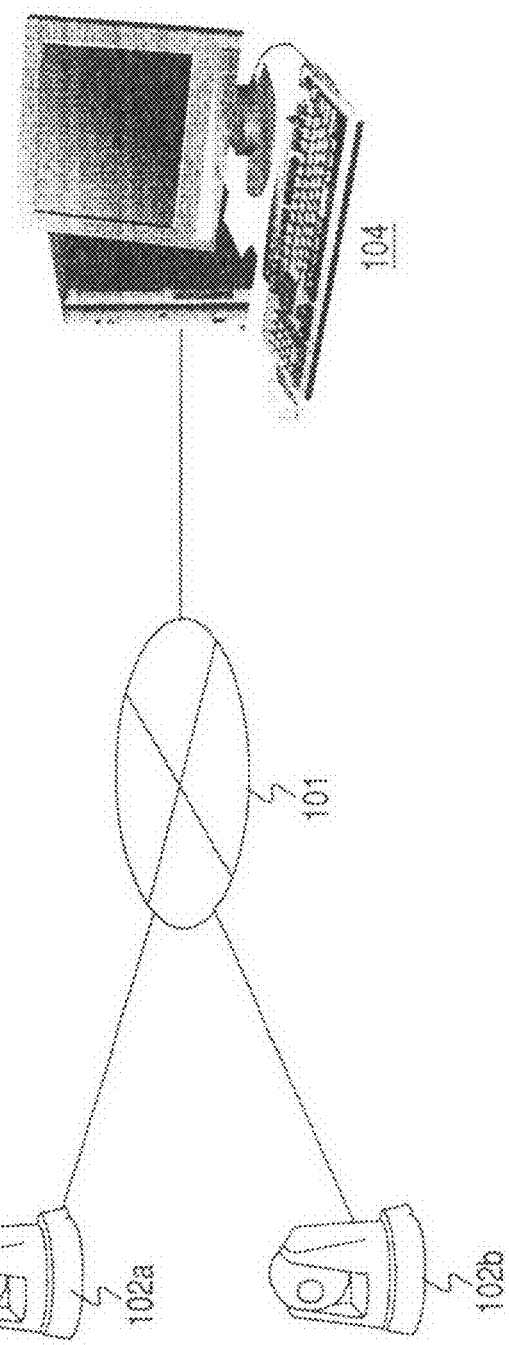
FIG. 3 shows a block diagram showing a surveillance camera system in which surveillance cameras and a surveillance apparatus are connected through a network.

Next, a surveillance camera system 100 as a specific example of the network system 10 will be explained. FIG. 3 shows a configuration example of the surveillance camera system 100. The surveillance camera system 100 has a configuration in which surveillance cameras 102a, 102b and a surveillance apparatus 104 are connected to a network 101. The surveillance apparatus 104 is formed by a personal computer.

The surveillance cameras 102a, 102b are PTZ-type cameras, having functions of panning, titling and zooming. The surveillance cameras 102a, 102b take surveillance pictures and generate picture data corresponding to the surveillance pictures, then, transmit the picture data to the surveillance apparatus 104. The surveillance cameras 102a, 102b have a function of detecting a moving object or a non-moving object, which generate metadata including information concerning the detected moving object or the non-moving object and transmit the metadata to the surveillance apparatus 104.

The surveillance apparatus 104 stores picture data and metadata transmitted from the surveillance cameras 102a, 102b through the network 101 in a storage and displays pictures according to the picture data on a monitor. A user can perform settings of panning, tilting and zooming of the surveillance cameras 102a, 102b, further, can perform a setting for detection conditions for a moving object or a non-moving object and the like on the side of the surveillance apparatus 104. When the user performs setting for detection conditions of the moving object or the non-moving object in the surveillance cameras 102a, 102b, the surveillance apparatus 104 provides a setting screen for the user.

A configuration example of the surveillance camera 102 (102a, 102b) will be explained with reference to FIG. 4.

Figure 4:
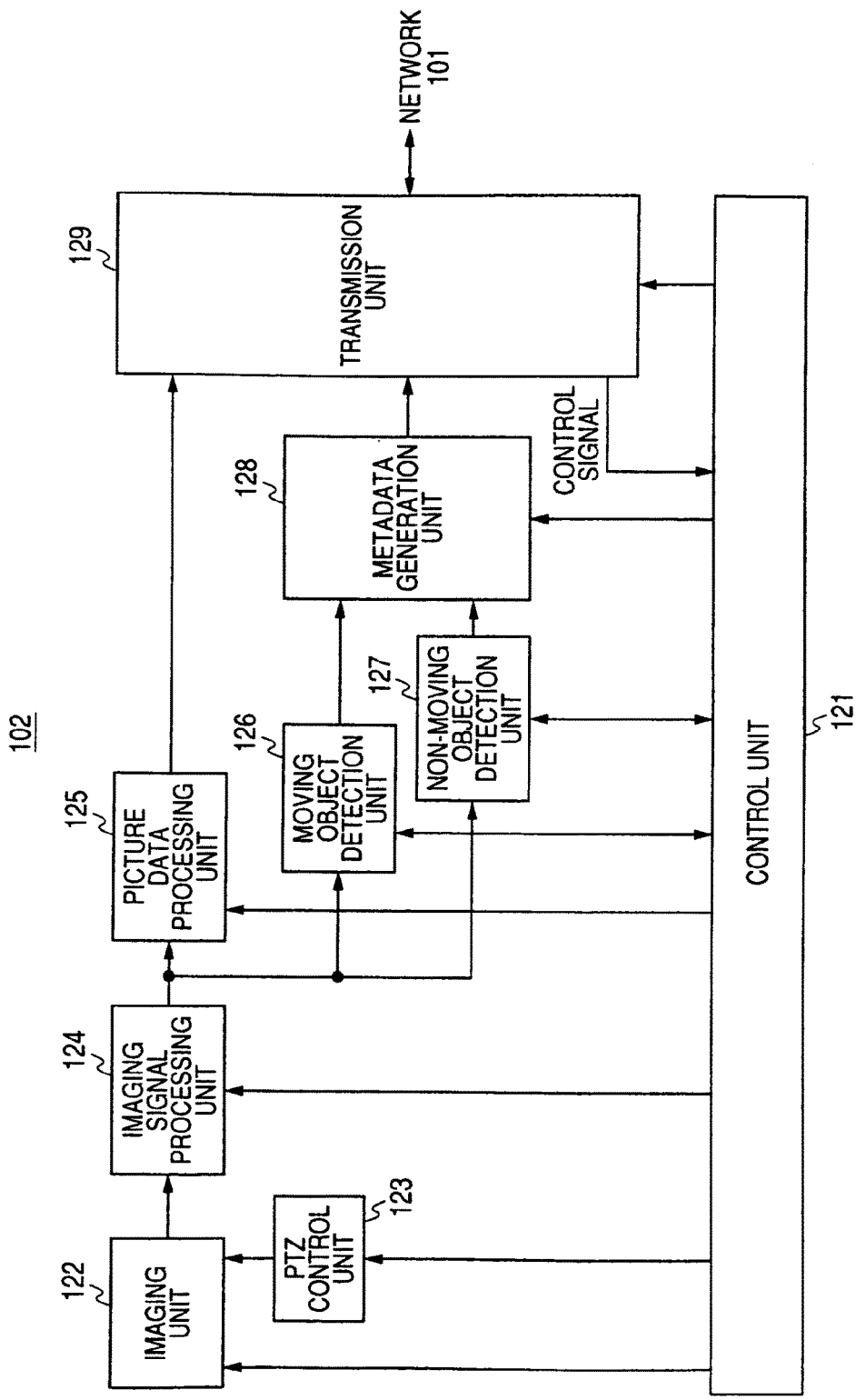
FIG. 4 is a block diagram showing a configuration example of a surveillance camera.

In FIG. 4, the surveillance camera 102 includes a control unit 121, an imaging unit 122, a PTZ control unit 123, an imaging signal processing unit 124, a picture data processing unit 125, a moving object detection unit 126, a non-moving object detection unit 127, a metadata generation unit 128 and a transmission unit 129.

The control unit 121 controls operation of respective units of the surveillance camera 102. The control unit 121 includes, for example, a CPU (Central Processing Unit), a ROM (Read Only Memory) and a RAM (Random Access Memory). In this case, the CPU reads out a control program stored in the ROM if necessary and transfers the read-out control program to the RAM to be opened, then, reads out the developed control program and executes the program, thereby controlling operation of respective units.

The imaging unit 122 includes an imaging lens and an imaging device which are not shown, taking surveillance pictures to output imaging signals corresponding to the surveillance pictures. The imaging device is the imaging device such as a CCD (Charged Coupled Device) or a CMOS (Complementary Metal-Oxide Semiconductor). The imaging device 122 further includes panning, tilting and zooming functions (PTZ function). The PTZ control unit 123 controls a panning position, a tilting position and zoom magnification in the imaging unit 122 under control of the control unit 121.

The imaging signal processing unit 124 generates picture data by performing sample-and-hold and gain control of imaging signals (analog signals) outputted from the imaging unit 122, conversion from analog signals to digital signals, white balance adjustment, and further, gamma correction and the like. The imaging unit 122 and the imaging signal processing unit 124 form a picture data generation unit. The picture data processing unit 125 generates compressed picture data by performing data compression processing with respect to picture data generated in the imaging signal processing unit 124.

The moving object detection unit 126 detects a moving object area from a picture according to picture data by processing picture data generated in the imaging signal processing unit 124. The non-moving object detection unit 127 detects a non-moving object area (object appearing area, object disappearing area) from a picture according to picture data by processing picture data generated in the imaging signal processing unit 124.

The moving object detection in the moving object detection unit 126 is performed in each frame when the detection of a moving object is selected by user setting and the detection status of the moving object detection unit 126 is in "during detection". In the case that the detection status of the moving object detection unit 126 is not in "during detection" but in "acquiring a background", "during PTZ operation, "video abnormality", "equipment abnormality" and the like, the moving object detection is not performed even when the moving object detection is selected. That is because it is difficult to perform the moving object detection in respective cases of ""acquiring a background", "video abnormality", and "equipment abnormality". In addition, in the case of "during PTZ operation", a detection result will be unstable though the detection operation itself is possible.

Similarly, the non-moving object detection in the non-moving object detection unit 127 is performed in each frame when the detection of a non-moving object is selected by user setting and the detection status of the non-moving object detection unit 127 is in "during detection". In the case that the detection status of the non-moving object detection unit 127 is not in "during detection" but in "acquiring a background", "during PTZ operation", "video abnormality", "equipment abnormality" and the like, the non-moving object detection is not performed even when the non-moving object detection is selected.

The metadata generation unit 128 generates metadata including detection information (refer to FIG. 2) in respective frames. In this case, the detection information is a detection status of the moving object detection unit 126 or the non-moving object detection unit 127 (detection status) and information concerning the moving object or the non-moving object detected by the moving object detection unit 126 or the non-moving object detection unit 127 (the number of objects, object information and the like). The metadata generation unit 128 generates detection information included in metadata based on the detection information from the detection units 126, 127 and information from the control unit 121.

The transmission unit 129 transmits the compressed picture data generated in the picture data processing unit 125 and the metadata generated in the metadata generation unit 128 to the surveillance apparatus 104 by protocols such as FTP (File Transfer Protocol), HTTP (Hypertext Transfer Protocol) through the network 101. The transmission unit 129 forms the data transmission unit. With respect to frames in which respective information included in detection information does not vary, the transmission unit 129 does not transmit the metadata to reduce transmission capacity. For example, when frames in which a moving object or non-moving object is not detected continue, transmission of a metadata is performed only at the first frame. In addition, when frames in a given detection status other than during detection continue, transmission of metadata is performed only at the first frame.

Figure 5:
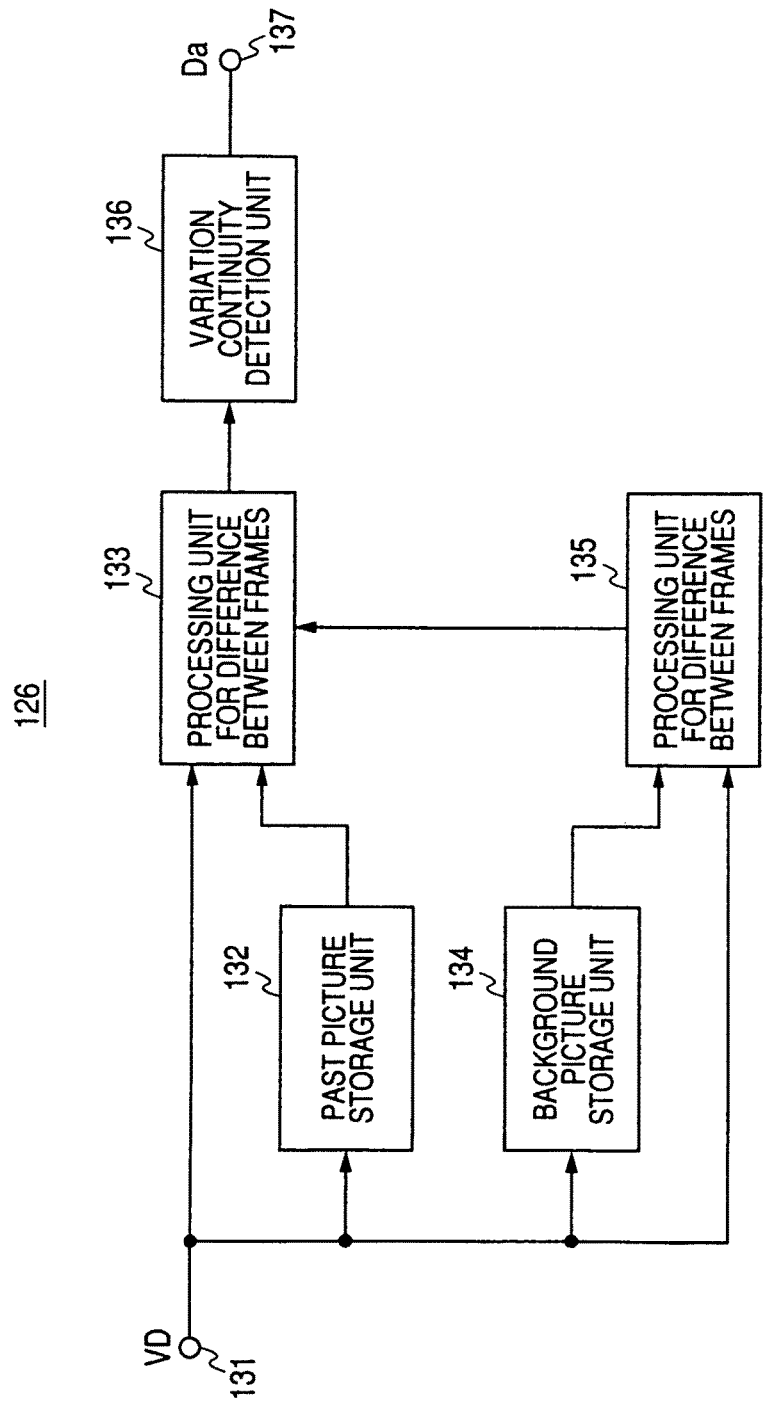
FIG. 5 is a block diagram showing a specific example of a moving object detection unit.

A specific example of the above moving object detection unit 126 (refer to JP-A-2004-266012) will be explained with reference to FIG. 5. In FIG. 5, the moving object detection unit 126 includes an input terminal 131, a past picture storage unit 132, a processing unit for difference between frames 133, a background picture storage unit 134, a processing unit for difference between frames 135, a variation continuity detection unit 136 and an output terminal 137.

The input terminal 131 is a terminal for inputting picture data VD. The past picture storage unit 132 stores picture data of several past frames as a data group of past pictures. The processing unit for difference between frames 133 calculates difference values between picture data of several past frames stored in the past picture storage unit 132 and picture data of the present frame inputted to the input terminal 131.

The background picture storage unit 134 stores picture data of background pictures. The processing unit for difference between frames 135 detects the difference between picture data of background pictures stored in the background picture storage unit 134 and picture data of the present frame inputted to the input terminal 131, detecting an area in present frame picture which is different from the background picture based on the difference value.

The above processing unit for difference between frames 133 performs processing of calculating difference values only at the detected area based on the area detected in the processing unit for difference between frames 135, thereby realizing high-speed processing, as well as preventing detection of an area in which a moving object existed in the past (residual image area) as a motion area.

The variation continuity detection unit 136 detects variation continuity in each pixel based on the difference values of several frames calculated in the processing unit for difference between frames 133, detecting whether a moving object area (motion area) or not. In this case, threshold processing is performed to the difference values of several frames in each pixel respectively, and when a state of exceeding the threshold continues for more than fixed time, the pixel is regarded as a pixel included in the moving object area.

Figure 6A:
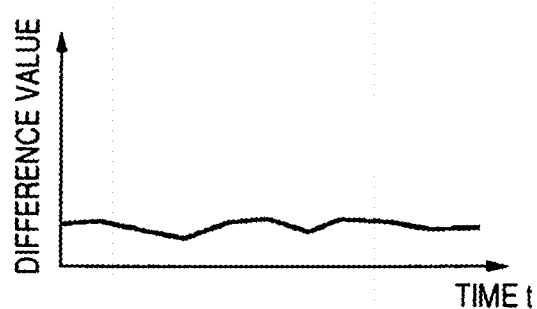
FIG. 6A to FIG. 6C are charts for explaining detection processing of variation continuity in the moving object detection unit.
Figure 6B:
Figure 6C:
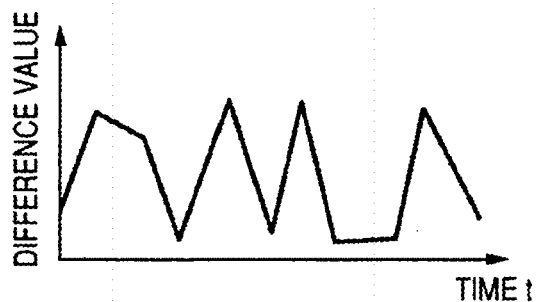

The detection processing in the variation continuity detection unit 136 will be further explained with reference to FIG. 6A to FIG. 6C. In FIG. 6A to FIG. 6C, difference values of several frames in a certain pixel are shown, taking time of past frames on a horizontal axis and difference values of respective past frames on a vertical axis.

When an object (moving object) does not exist in a certain pixel, difference values of several frames continues in a small state as shown in FIG. 6A. Next, in the case that an object enters into the certain pixel at a frame of a time "t1" and the object exists in the present frame, difference values in frames previous to the time "t1" are large, and difference values after the time "t1" are small as shown in FIG. 6B. Next, when there is sway (periodic motion) such as leaves or waves in the certain pixel, difference values vary at random as shown in FIG. 6C.

As described above, when an object enters into a certain pixel, a state in which difference values are large continues for a certain period of time as shown in FIG. 6B. Therefore, the variation continuity detection unit 136 regards the pixel as being included in the moving object area when the number of continuous frames in which difference values are large is counted and the values exceed the predetermined number.

When there is sway such as leaves or waves in the certain pixel, the number of continuous frames in which difference values are large is few as shown in FIG. 6C, therefore, the certain pixel is not regarded as a pixel included in the motion area. Also, in the case that there is luminance variation not by entrance of an object (sporadic motion) in a certain pixel, though the difference values are not shown, the number of continuous frames in which difference values are large is few as in the above case that there is sway such as leaves or waves (periodic motion), therefore, the certain pixel is not regarded as the pixel included in the motion area. Accordingly, sporadic or periodical motion areas are excluded as the motion areas, and only the area of pictures into which an object enters can be detected.

The variation continuity detection unit 136 detects a moving object area Da by performing labeling such as binding processing with adjacent pixels with respect to respective pixels regarded as pixels included in the motion area as described above, outputting the information thereof to the output terminal 137.

The operation of the moving object detection unit 126 shown in FIG. 5 will be explained. The picture data VD is inputted to the input terminal 131. The picture data VD is supplied to the background picture storage unit 134 and the picture data VD in a state in which an object does not exist is stored as picture data of a background picture.

The picture data VD inputted to the input terminal 131 is supplied to the processing unit for difference between frames 135. Then, the processing unit for difference between frames 135 detects a difference value between picture data of background pictures stored in the background picture storage unit 134 and picture data of the present frame inputted to the input terminal 131, and an area which is different from the background picture in the present frame picture is detected based on the difference value.

The picture data VD inputted to the input terminal 131 is supplied to the past picture storage unit 132 and picture data of several past frames are stored in the past picture storage unit 132 as a data group of past pictures.

The picture data VD inputted to the input terminal 131 is supplied to the processing unit for difference between frames 133. Then, the processing unit for difference between frames 133 calculates difference values between picture data of several past frames stored in the past picture storage unit 132 and picture data of the present frame inputted to the input terminal 131. In this case, processing of calculating difference values is performed only at the detection area based on the area detected in the above processing unit for difference between frames 135, which realizes speed-up of processing as well as prevents detection of the residual image area.

The difference values of several frames calculated in the processing unit for difference between frames 133 are supplied to the variation continuity detection unit 136. The variation continuity detection unit 136 performs threshold processing to the difference values of several frames in each pixel respectively, and in the case that a state of exceeding a threshold continues for more than a certain period of time, the decision that the pixel is included in the moving object area is made.

The variation continuity detection unit 136 performs labeling such as binding processing with adjacent pixels based on respective pixels regarded as pixels included in the moving object area as described above to detect the moving object area Da. The information of the moving object area Da is outputted to the output terminal 137.

Next, a specific example of the non-moving object detection unit 127 (refer to JP-A-2005-157588) will be explained with reference to FIG. 7. In the example, weighted-mixed normal distribution is used as an update method of a reference background picture.

Figure 7:
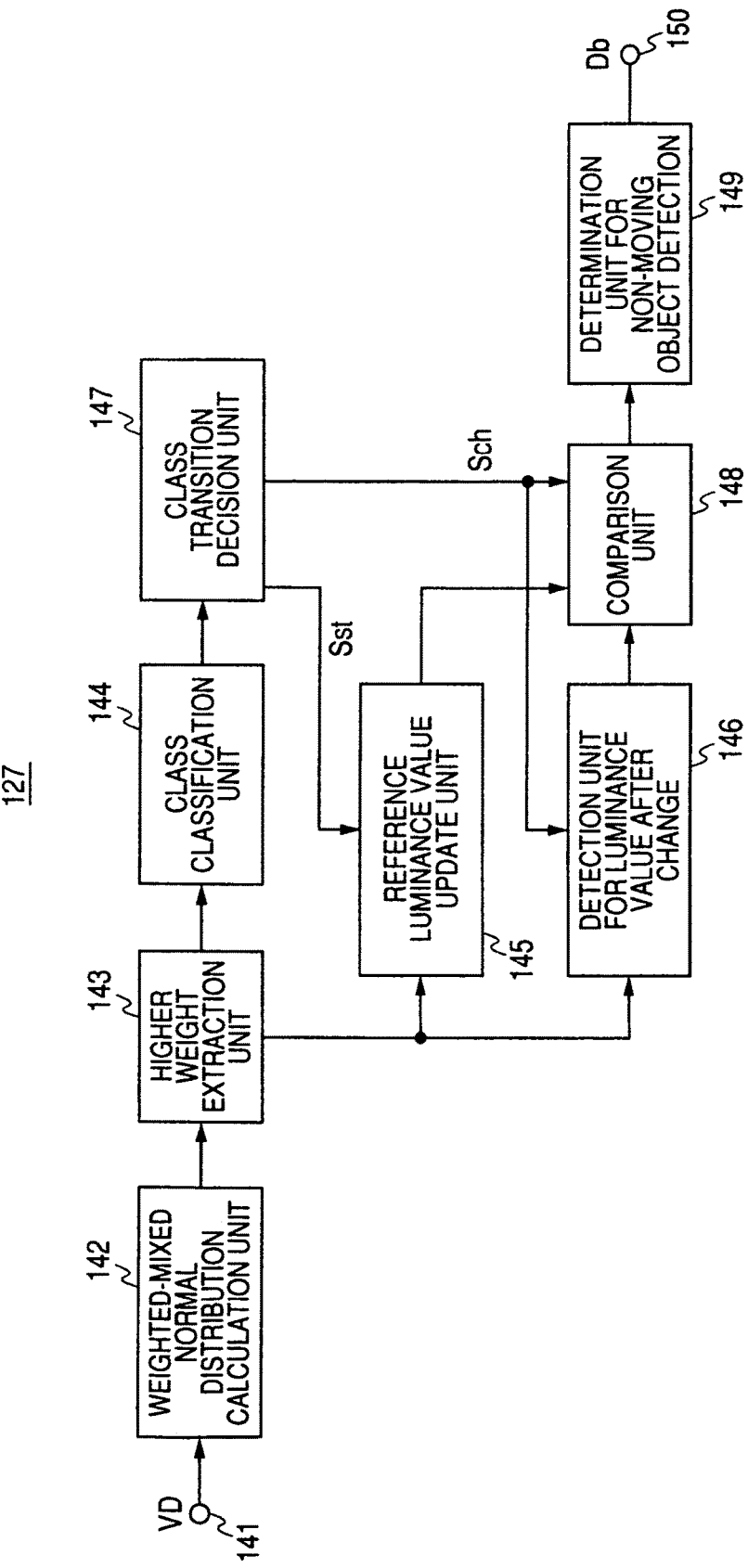
FIG. 7 is a block diagram showing a specific example of a non-moving object detection unit.

In FIG. 7, the non-moving object detection unit 127 includes an input terminal 141, a weighted-mixed normal distribution calculation unit 142, a higher weight extraction unit 143, a class classification unit 144, a reference luminance value update unit 145, a detection unit for luminance value after change 146, a class transition decision unit 147, a comparison unit 148, a determination unit for non-moving object detection 149 and an output terminal 150.

The input terminal 141 is a terminal for inputting the picture data VD. The weighted-mixed normal distribution calculation unit 142 determines that the luminance value belongs to which of plural numbers of luminance normal distributions by every pixel and updates weights of respective plural numbers of luminance normal distributions as well as updates average values. Then, the weighted-mixed normal distribution calculation unit 142 supplies the calculated results (at least weights and average values (average luminance values) of respective distributions) to the higher weight extraction unit 143.

Here, update of the average value and the weight of the luminance normal distribution will be further explained.

A probability P(Xt) of a luminance Xt of a pixel at present (time point "t") can be generally represented by a formula (1).

$$P(X_t) = \sum_{i=1}^{k} w_{i,t} \times \eta\left(X_t, \mu_{i,t}, \sum_{i,t}\right) \tag{1}$$

k: the number of normal distributions
Wi, t: weight of ith normal distribution at time "t"
μi, t: average value of ith normal distribution at time "t"
Σi, t: covariance of ith normal distribution at time "t"
η: probability density function The probability density function η can be represented by a formula (2).

$$\eta(X_t, \mu, \Sigma) = \frac{1}{(2\pi)^{\frac{n}{2}}|\Sigma|^{\frac{1}{2}}} e^{-\frac{1}{2}(X_t-\mu_t)^T \Sigma^{-1}(X_t-\mu_t)} \tag{2}$$

Here, covariance matrix $\Sigma_{k,t}$ is $$\Sigma_{k,t} = \sigma k^2 I$$

It is searched that luminance of each pixel belongs to which of k-pieces (K is a positive integer) of normal distributions. For example, in the case of picture data whose luminance data in one pixel is represented by 8-bit, four luminance normal distributions are prepared and that the luminance of each pixel belongs to which of the four luminance normal distributions is searched.

Whether the luminance Xt of a certain pixel has a value within the average value $\mu k \pm 2\sigma k$ of the luminance normal distribution is determined, and if it is within the value, the luminance is determined to belong to the luminance normal distribution, and if it is not within the value, the luminance is determined not to belong to the luminance normal distribution. If the luminance does not belong to any luminance normal distribution, the average value μ of the luminance normal distribution whose weight is the lowest which will be described later in the k pieces of luminance normal distributions is replaced with the luminance Xt of the pixel at the time.

Weight "wk, t" of each luminance normal distribution is updated so that the weight of the luminance normal distribution to which the luminance Xt of the pixel belongs becomes high and the weight of the luminance normal distribution to which the luminance Xt does not belong becomes low by each pixel. That is, for example, the weight "wk, t" of the luminance normal distribution to which the luminance Xt of the pixel belongs is updated according to the following formula (3), and the weight "wk, t" of the luminance normal distribution to which the luminance Xt does not belong is updated according to the following formula (4). In the formula (3) and in the formula (4), α is an update speed of the weight, and 0≤α≤1.

$$W_{k,t}=(1-\alpha)W_{k,t-1}+\alpha \quad (3)$$

$$W_{k,t}=(1-\alpha)W_{k,t-1} \quad (4)$$

An average value μt and a variance σ of each luminance normal distribution are updated based on the following formula (5), formula (6) and formula (7).

$$\mu_t=(1-p)\mu_{t-1}+pX_t \quad (5)$$

$$\sigma^2=(1-p)\sigma^2_{t-1}+p(X_t-\mu_t)^T(X_t-\mu_t) \quad (6)$$

$$p=\alpha\eta(X_t|\mu_k,\sigma_k) \quad (7)$$

Figure 8:
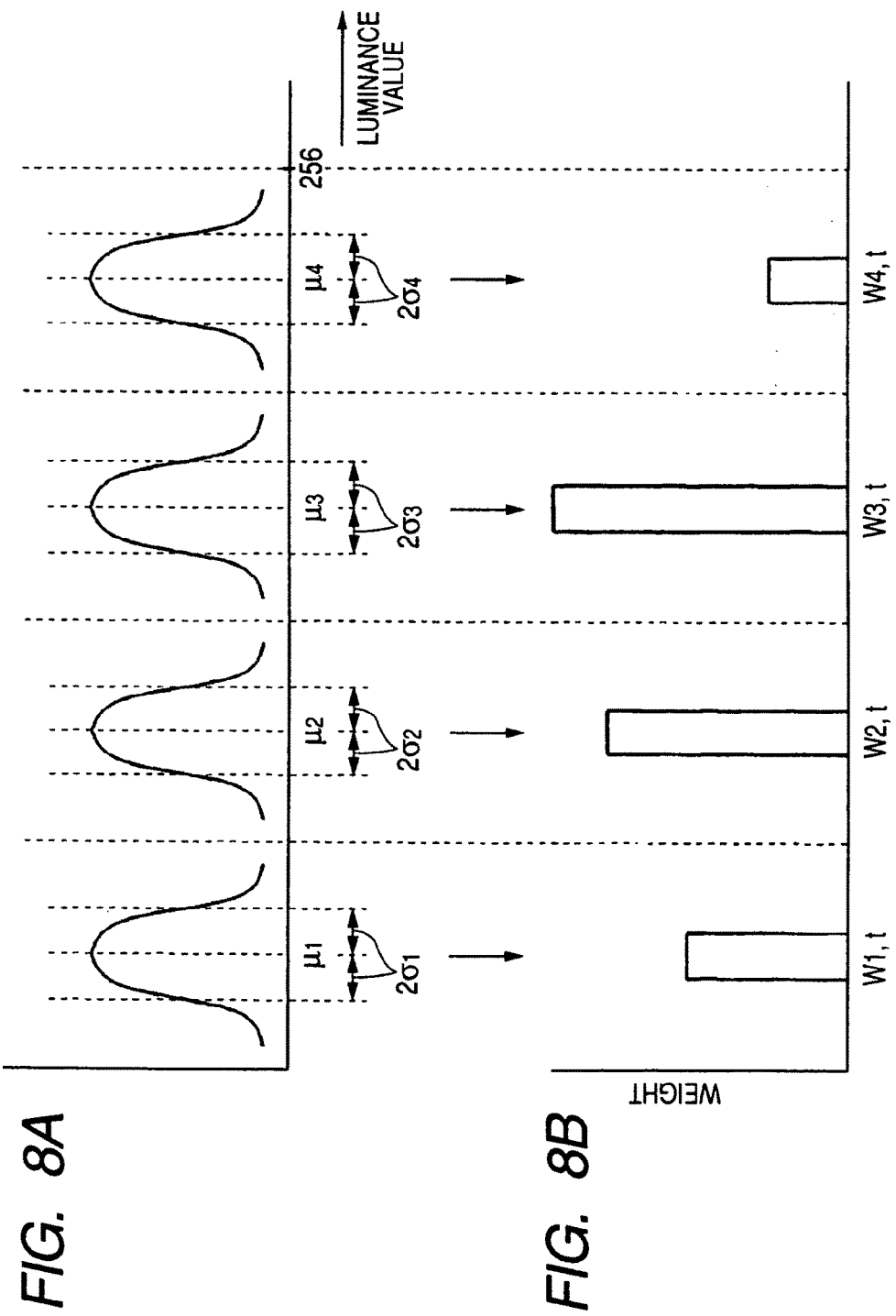
FIG. 8A and FIG. 8B are charts for explaining weighted mixed normal distribution.

According to the above, information of each weight "wk, t" of the plural pieces of luminance normal distributions is updated with respect to each pixel as shown in FIG. 8B.

The higher weight extraction unit 143 supplies weights of distributions having the top two weight amounts in plural luminance normal distributions to the class classification unit 144 and supplies the average luminance value of the distribution whose weight is the maximum to the reference luminance value update unit 145 and the detection unit for luminance value after change 146.

The class classification unit 144 classifies variation states of pixel luminance at this time by using weights of distributions having the top two weight amounts based on the following formula (8) and formula (9) and supplies class information as the classified results to the class transition decision unit 147.

The class classification using weights of distributions having the top two weight amounts will be explained. In this case, classification is performed based on the relation of weights of luminance normal distributions having the top two weight amounts, particularly, based on the ratio of weights of the top-two luminance normal distributions in the present embodiment. The classification is performed based on the value of a ratio "r" represented by the formula (8) when a weight having the higher amount is "wb" and a weight having the lower amount is "ws" in weights of the top-two luminance normal distributions.

$$r=wb/ws \quad (8)$$

In this case, the ratio r=1, or in the vicinity of 1, it is unstable that the pixel luminance belongs to which of the top two luminance normal distributions, therefore, the luminance will be in an unstable class.

When the ratio "r" is a predetermined value or more, the weights of the top two luminance normal distributions have large difference, and it is possible to stably determine that the pixel luminance belongs to which of the luminance normal distributions, therefore, the luminance will be in a stable class. The intermediate state between the stable class and the unstable class will be an intermediate class.

A threshold for class-classification with respect to the value of the ratio "r" is decided by, for example, trial and error. In the present embodiment, for example, the threshold is shown by a formula (9).

Unstable class; 1≤r≤1. 1 to 1.2

Intermediate class; 1.1 to 1.2≤r≤1.5

Stable class; 1.5≤r  (9)

The class transition decision unit 147 decides time transition of class information from the class classification unit 144. The class transition decision unit 147 generates an update timing signal of the reference luminance value Sst and a luminance-change detection timing signal Sch based on the decided class transition.

Figure 9:
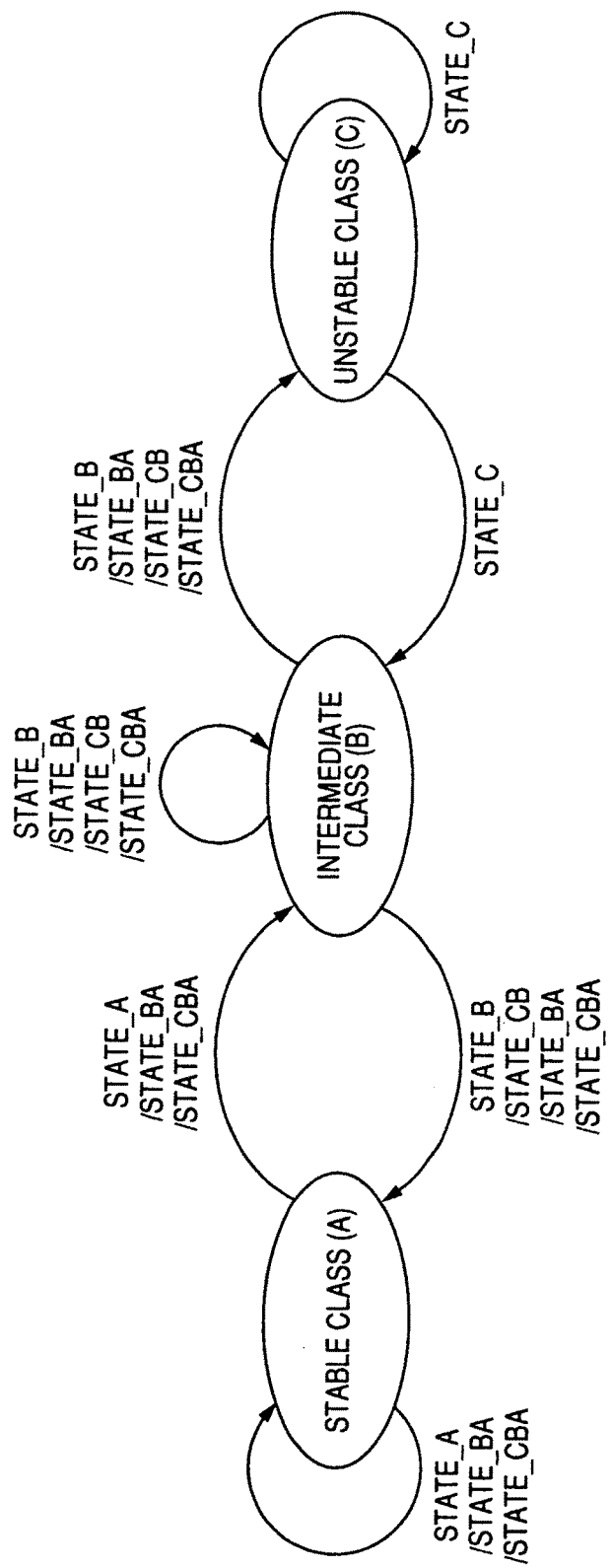
FIG. 9 is a view showing a class transition states when a state of pixel luminance is classified into three classes of a stable class, an intermediate class and an unstable class.

FIG. 9 shows transition states when the states of pixel luminance is classified into three classes of the stable class, the intermediate class and the unstable class based on the ratio of weights between the top two luminance normal distributions. In FIG. 9, the stable class is denoted as "A", the intermediate class is denoted as "B" and the unstable class is denoted as "C" and a value representing the transition state, namely, the transition state value is denoted as STATE_X. In this case, X in the transition state value STATE_X will be C (STATE_C) when the state becomes C, and in other states, the value will be decided by considering the state of the previous class.

That is, STATE_A and STATE_B are transition state values in the case that initial states are A class and B class. The transition state value will be STATE_C when the initial state is C class. STATE_BA is a transition state value when the transition was made from A class to the B class or when the transition was made from B class to A class. STATE_CB is a transition state value when the transition was made from B class to C class or when the transition was made from C class to B class. And further, STATE_CBA is a transition state value when the transition was made from A class to B class, further to C class, or from C class to B class, further to A class.

In the case that the transition state value of the initial state was STATE_A, and the transition was made such as, for example, stable→intermediate→unstable, the transition state value varies from STATE_A to STATE_BA, and then, varies to STATE_C.

In addition, STATE_A indicates that the distribution of the maximum weight does not vary and there is no change. STATE_CBA indicates the distribution in which the weight amount varied from the second order to the maximum, which represents that an object existed in the surveillance area until now disappears or that a still object enters into the surveillance area.

Therefore, in the embodiment, the timing when a non-moving object is detected, namely, the luminance change detection timing is when the transition state value is STATE_CBA. Also in the embodiment, in order to increase stability, the class transition decision unit 147 does not decide the timing immediately when the transition state value becomes STATE_CBA as the luminance change detection timing, and when the state of STATE_CBA continues for a certain period of time, the class transition decision unit 147 generates and outputs the luminance change detection timing signal Sch as the luminance change detection timing.

For example, in the embodiment, the luminance change detection (non-moving object detection) is not performed in every frame of picture data but, for example, in every four frames. The luminance change detection timing is decided after the state of STATE_CBA continues, for example, 30 times (4 seconds).

Figure 10:
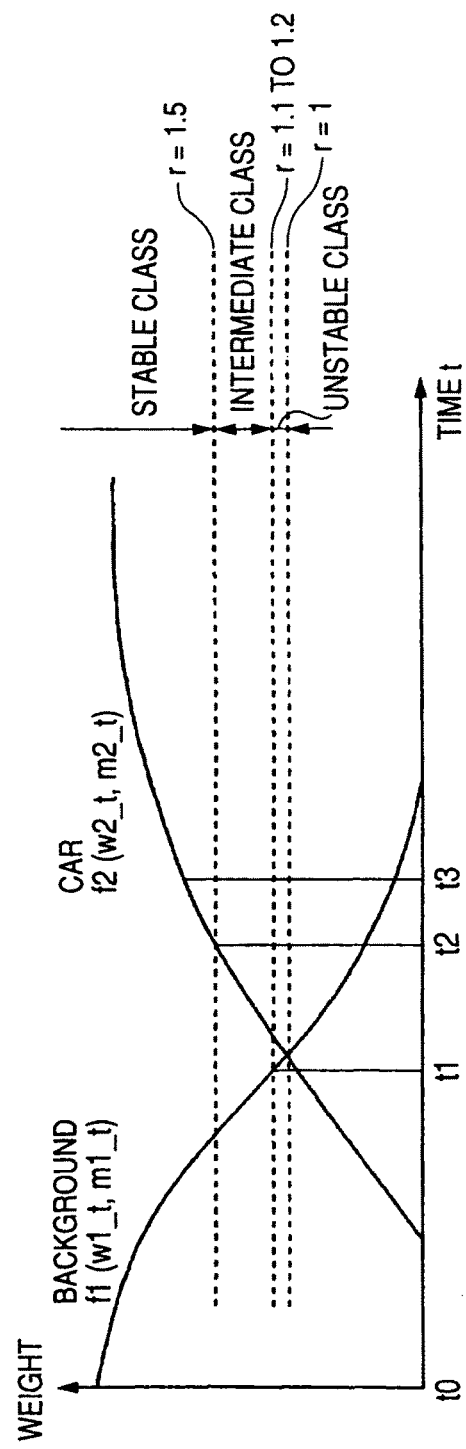
FIG. 10 is a view showing a transition example of weight and class-classification (non-moving object is detected) of a background and a car.

Here, an example of FIG. 10 will be explained. In the example, the above-described three classes are shown concerning the transition of the top-two weights when a car entered into the surveillance area and stopped. In FIG. 10, f1 (w1_$t$, m1_$t$) represents a background having a weight "w1_$t$" and a luminance (average value of luminance normal distribution) m1_$t$ at a time "t", and f2 (w2_$t$, m2_$t$) represents a car having a weight w2_$t$ and luminance (average value of luminance normal distribution) m2_$t$ at a time "t". Both the weight and the luminance (average value of luminance normal distribution) are updated according to the lapse of time "t" by the above formula (5), formula (6), and formula (7).

As shown in FIG. 10, at first, the weight of the background "w1_$t$" is high. When a car stops, the weight of the car "w2_$t$" gradually increases, and the weight of the background "w1_$t$" decreases accordingly, and at last, the weight of the car "w2_$t$" becomes maximum. Therefore, when the change of the average value (luminance) of the luminance normal distribution having the highest weight, that is, in the case of FIG. 10, the difference between m1_$t$ and m2_$t$ is detected, thereby finding that a part of the pixel to be focused changes from the background to the stopped car.

In the example of FIG. 10, a time point "t2" is the time when the transition state value becomes STATE_CBA, and the luminance change detection timing is at a time point "t3". In addition, the class transition decision unit 147 decides the timing of updating the reference luminance value to be the case of STATE_BA or STATE_CBA in which the relation between the top two weights is the unstable class as well as the transition state value of the last time indicates that the transition state belonged to the stable class. The class transition decision unit 147 generates the updating timing signal of the reference luminance value Sst at the time of the update timing of the reference luminance value. The time point of the update timing is the timing of the time point "t1" in the example of FIG. 10.

In the case that more than the designated existence time has not been passed from the generation time of the luminance change detection timing signal Sch of the last time, the class transition decision unit 147 does not generate the update timing signal of the reference luminance value Sst and does not update the reference luminance value, even when the time point is decided to the time point as the update timing in order to prevent an object whose existence time is short from being detected as a non-moving object.

According to the above, in the embodiment, a flag (hereinafter, referred to as an "update flag") indicating whether the update of the reference luminance value is allowed or not is prepared. The update flag is in a state of allowing the update as "false" in the initial state. That is, the flag is referred to at the update timing point, and when the update flag shows "false", the update timing signal Sst are allowed to be generated and outputted.

In the embodiment, when the reference luminance value is updated at the update timing, namely, when the update timing signal Sst is outputted, the update flag is in a state of prohibiting the update as "true". The class transition decision unit 147 does not output the update timing signal Sst when the update flag is in the state of "true".

When the state of "true" of the update flag continues more than the designated existence time of an object to be detected, the class transition decision unit 147 returns the flag to "false", thereby allowing the output of the update timing signal Sst. It is also preferable that the class transition decision unit 147 returns the update flag from "true" to "false" when it can be judged that there is no the luminance change of the pixel.

As described above, the class classification decision unit 147 generates the update timing signal of the reference luminance value Sst and supplies the update timing signal of the reference luminance value Sst to the reference luminance value update unit 145. The reference luminance value update unit 145 acquires and updates the average value of the luminance normal distribution having the highest weight as the reference luminance value according to the update timing signal of the reference luminance value Sst.

The class transition decision unit 147 also supplies the luminance change detection timing signal Sch generated as the above to the detection unit for luminance value after change 146. The detection unit for luminance value after change 146 acquires the average value of the luminance normal distribution having the highest weight as the luminance value after change according to the luminance change detection timing signal Sch.

The reference luminance value updated in the reference luminance value update unit 145 is supplied to the comparison unit 148 and the luminance value after change acquired in the detection unit for luminance value after change 146 to the comparison unit 148. Further, the luminance change detection timing signal Sch from the class transition decision unit 147 is supplied to the comparison unit 148 as a comparison timing signal. In the comparison unit 148, the luminance value after change acquired in the detection unit for luminance value after change 146 and the reference luminance value updated in the reference luminance value update unit 145 are compared, and whether there is the significant difference between them is determined, then, the compared determination result is supplied to the determination unit for non-moving object detection 149.

Receiving the compared determination result from the comparison unit 148, the determination unit for non-moving object detection 149, when the compared determination result indicates that there is the significant difference between the luminance value after change and the reference luminance value, stores the time at that point, for example, a frame number as the non-moving object detection time. When the state in which the compared determination result indicates that there is the significant difference between the luminance value after change and the reference luminance value continues after that, the determination unit for non-moving object detection 149 becomes in the state of detecting the non-moving object after the predetermined period of time.

The above detection processing operation of the non-moving object concerning the example of FIG. 10 will be further explained. In FIG. 10, the update flag is "false" and the reference luminance value is m1_t0 in the initial state is t=t0. At the time point t=t1 shown in FIG. 10, the update flag is "false", and the state of pixel luminance is in the unstable class from the relation between the top two weights, further, the previous transition state value is STATE_BA, therefore, the update timing signal Sst is generated, the reference luminance value is updated from m1_t0 to m1_t1, and the update flag becomes "true".

At the time point t=t3, the luminance change detection timing signal Sch is generated, therefore, the reference luminance value m1_t1 is compared to the luminance value after change m2_t3, thereby detecting change of the luminance value of the pixel. At this time, since there is the significant difference between the reference luminance value m1_t1 and the luminance value after change m2_t3, the time at that point, for example, a frame number is stored as the detection time. If there is no change after that, it is regarded that a non-moving object is detected.

Figure 11:
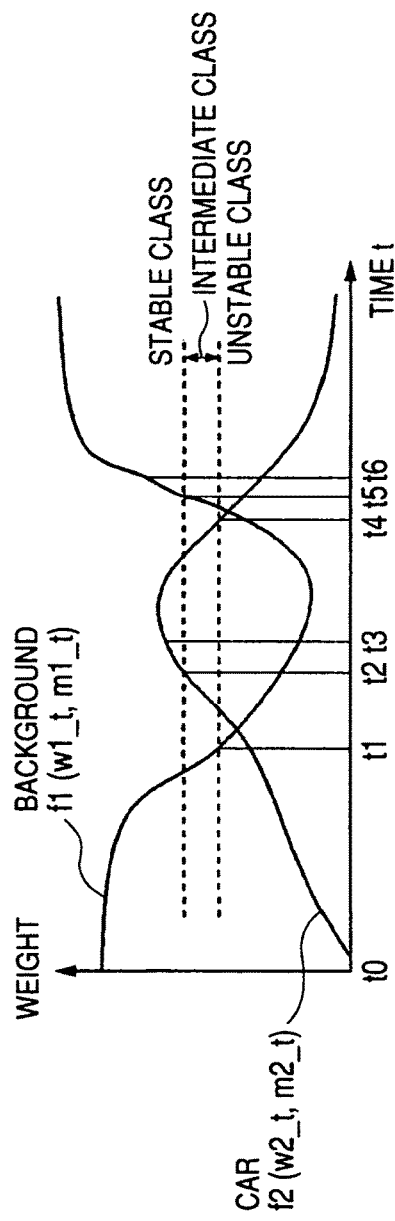
FIG. 11 is a view showing a transition example of weight and class-classification (non-moving object is not detected)

Next, the case in which an object which has stopped once started moving within the designated existence detection time will be explained with reference to an example of FIG. 11. In the example of FIG. 11, f1 (w1_t, m1_t) denotes variation of weight with respect to a background, and f2 (w2_t, m2_t) denotes variation with respect to a car. In the initial state "t0", the update flag is "false" and the reference luminance value is m1_t0.

At a time point t1, the relation between the top two weights is in the state of the unstable class and previous transition state value is STATE_BA, therefore, the reference luminance value is updated from m1_t0 to m1_t1, and the update flag becomes "true". At a time point "t3", the reference luminance value m1_t1 is compared to the luminance value after change m2_t3, thereby detecting change of the luminance value of the pixel. Since a next time point "t4" is within the designated existence time from the previous luminance change detection timing point "t3", the update flag does not return to "false" and maintains the state of "true". Therefore, at a time point "t4", the update of the reference luminance value is not performed.

At a time point "t6" which is the next luminance change detection timing, the reference luminance value m1_t1 is compared to the luminance value after change m1_t6 at this time point "t6", therefore, it is regarded that there is no change in the luminance value of the pixel. In the case of the object which moves with shorter time stop than the designated existence time, it is not regarded that a non-moving object is detected.

The determination unit for non-moving object detection 149 performs the above non-moving object detection processing in each pixel. When the non-moving detection processing in each pixel ends, the determination unit for non-moving object detection 149 performs block processing based on the detection flag for sorting detection areas detected in each pixel. In the block processing, for example, when a range of length×width=4×4 pixels is regarded as one block, if more than half of pixels have been detected in a block, all pixels in the block is regarded to be detected as non-moving objects. Conversely, if more than half of pixels have not been detected in the block, pixels in the block are regarded not to be detected as non-moving objects. In this case, the block range can be moved by shifting the pixel one by one, or shifting them every four pixels.

The determination unit for non-moving object detection 149 detects a non-moving object area Db by performing labeling such as binding processing with adjacent pixels with respect to the block detection area as described above. Information of the non-moving object area Db is outputted to the output terminal 150.

The operation of the surveillance camera 102 shown in FIG. 4 will be explained. Imaging signals (analog signals) corresponding to surveillance pictures are obtained from the imaging unit 122. The imaging signals are supplied to the imaging signal processing unit 124. In the imaging signal processing unit 124, analog signal processing such as sample-and-hold and gain control, and digital signal processing such as A/D conversion processing, white balance adjustment, and gamma correction are performed with respect to the imaging signals to generate picture data. The picture data is supplied to the picture data processing unit 125. In the picture data processing unit 125, data compression processing is performed to the picture data to generate compressed picture data. The compressed picture data is supplied to the transmission unit 129.

The picture data generated in the image signal processing unit 124 is supplied to the moving object detection unit 126 and the non-moving object detection unit 127. In the moving object detection unit 126, picture data is processed and a moving object area is detected when the moving object detection is selected. Information of the moving object area detected in the moving object detection unit 126 is supplied to the metadata generation unit 128.

In the non-moving object detection unit 127, picture data is processed and a non-moving object area is detected when the non-moving object detection is selected. Information of the non-moving object area detected in the non-moving object detection unit 127 is supplied to the metadata generation unit 128.

In the metadata generation unit 128, metadata (refer to FIG. 2) including information concerning the moving object or non-moving object detected in the moving object detection unit 126 or the non-moving object detection unit 127 (the number of objects, object information) as well as information indicating the detection statuses of these detection units (detection status) is generated by every frame based on the detection information from the detection units 126, 127 and information from the control unit 121 and the like. The metadata generated in the metadata generation unit 128 is supplied to the transmission unit 129.

In the transmission unit 129, compressed picture data generated in the picture data processing unit and metadata generated in the metadata generation unit 128 are transmitted to the surveillance apparatus 104 through the network 101 by protocols such as FTP and HTTP. In frames in which there is no change in respective information included in the detection information such as the case that frames in which a moving object or non-moving object is not detected continue, or the case that frames in a certain detection status other than "during detection" continue, metadata is transmitted only at the first frame to reduce the transmission capacity.

Next, a configuration example of the surveillance apparatus 104 will be explained by using function blocks of FIG. 12.

Figure 12:
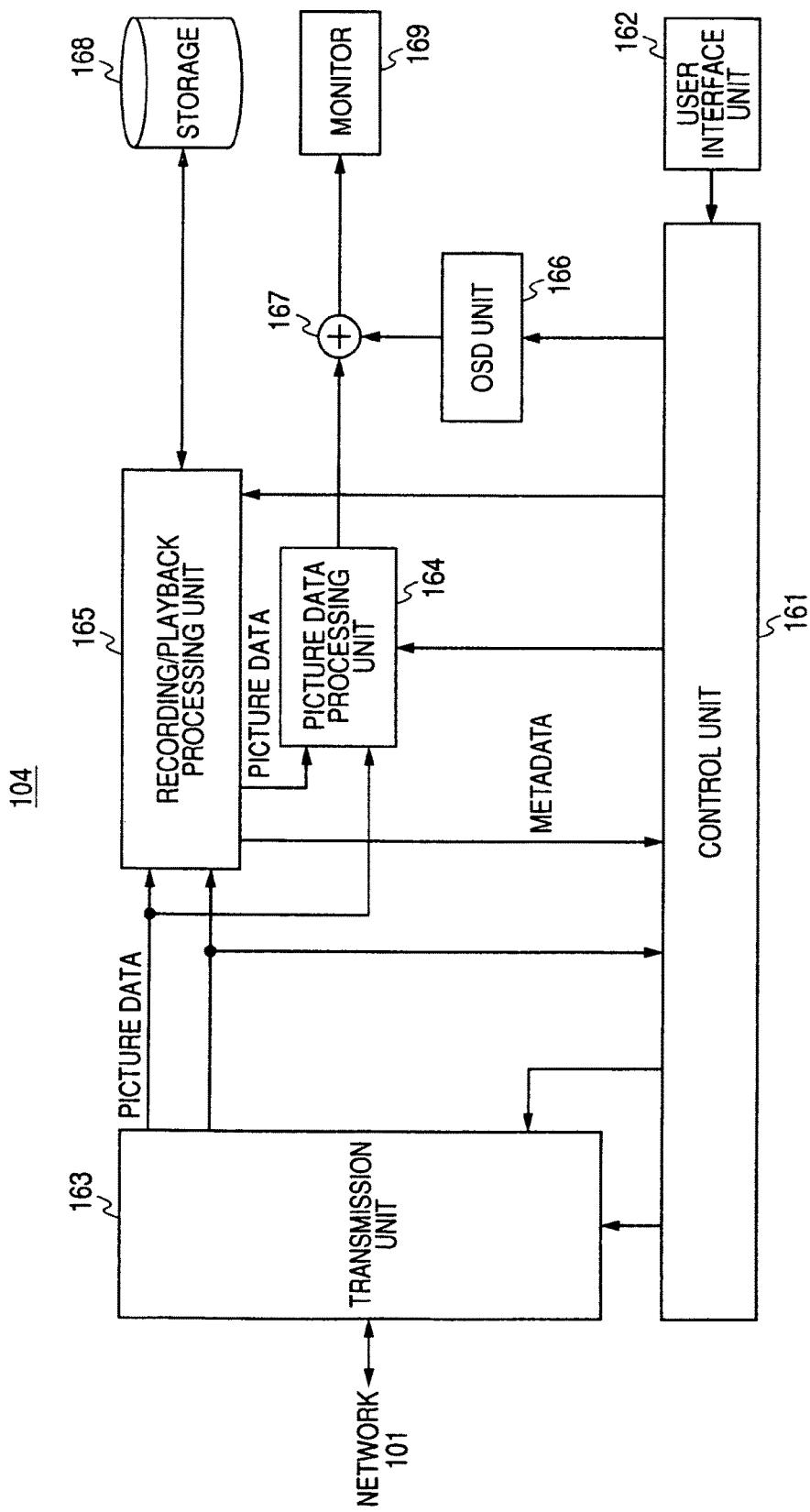
FIG. 12 is a function block diagram showing a configuration example of a surveillance apparatus.

In FIG. 12, the surveillance apparatus 104 includes a control unit 161, a user interface unit 162, a transmission unit 163, a picture data processing unit 164, a recording/playback processing unit 165, an on-screen display (OSD) unit 166, a synthesizing unit 167, a storage 168 and a monitor 169.

The control unit 161 controls the operation of respective units of the surveillance apparatus 104. The control unit 161 includes a CPU. The CPU reads out a control program stored in a ROM and the like if necessary and transfers the read-out control program to RAM and opens the program, then, the opened control program is read out and executed to control the operation of respective units. The user interface unit 162 includes operation keys, a remote-control signal receiver and the like. The user interface unit 162 is connected to the connection unit 161. The user interface unit 162 generates an operation signal according to the user operation and supplies it to the control unit 161.

The transmission unit 163 receives picture data (compressed picture data) and metadata transmitted from the surveillance camera 102 (102a, 102b) through the network 101. The storage 168 records picture data (compressed picture data) and metadata received in the transmission unit 163. The storage 168 includes, for example, a hard disc drive (HDD). The recording/playback processing unit 165 records picture data and metadata to the storage 168, further, controls playback of picture data and metadata from the storage 168.

The picture data processing unit 164 performs data decompression processing to picture data (compressed picture data) received at the transmission unit or picture data (compressed picture data) played back from the storage 168 to generate picture data for output. The picture data processing unit 164 usually performs data decompression processing to picture data received in the transmission unit 163, however, performs data decompression processing to picture data played back from the storage 168 at the time of playback.

The OSD unit 166 generates OSD display signals based on control of the control unit 161. For example, the OSD unit 166 generates display signals for displaying detection information when displaying detection information in the detection units 126, 127 of the surveillance camera 102 (information indicating detection statuses of the detection units and information concerning a moving object or a non-moving object detected in the detection units).

The synthesizing unit 167 synthesizes display signals outputted from the OSD unit 166 on picture data obtained in the picture data processing unit 164, supplying the synthesized signals to the monitor 169. In this case, on the monitor 169, pictures according to picture data obtained in the picture data processing unit 164 are displayed as well as the OSD display according to the display signals outputted from the OSD unit 166 is performed on the monitor 169.

The operation of the surveillance apparatus 104 shown in FIG. 12 will be explained. In the transmission unit 163, picture data (compressed picture data) and metadata transmitted from the surveillance camera 102 (102a, 102b) are received. The picture data is supplied to the recording/playback processing unit 165 and the picture data processing unit 164. On the other hand, metadata is supplied to the recording/playback processing unit 165 and the control unit 161. When the recording is instructed by user setting, the picture data and metadata are recorded in the storage 168 by the recording/playback processing unit 165.

In the picture data processing unit 164, data decompression processing is performed to picture data supplied from the transmission unit 163 to generate picture data for output. The control unit 161 controls the OSD unit 166 based on metadata supplied from the transmission unit 163 to allow the OSD unit 166 to generate display signals for displaying detection information and the like in the detection units 126, 127 of the surveillance camera 102.

In the synthesizing unit 167, display signals generated in the OSD unit 166 are synthesized on the picture data obtained in the picture data processing unit 164, and the synthesized signals are supplied to the monitor 169. Accordingly, pictures corresponding to the surveillance pictures taken by the surveillance camera 102 (102a, 102b) are displayed on the monitor 169. In addition, detection information and the like in the detection units 126, 127 of the surveillance camera 102 are OSD-displayed on the pictures.

At the time of playback of picture data and metadata from the storage 168, the played back picture data is supplied to the picture data processing unit 164 through the recording/playback processing unit 165, and the played back metadata is supplied to the control unit 161 through the recording/playback processing unit 165. After that, pictures according to the picture data played back on the monitor 169, and on that pictures, for example, detection information and the like in the detection units 126, 127 of the surveillance camera 102 is OSD-displayed in the same manner as the operation with respect to picture data and metadata received in the transmission unit 163.

As described above, in the surveillance camera system 100 shown in FIG. 3, picture data and metadata are transmitted from the surveillance camera 102 (102a, 102b) to the surveillance apparatus 104. The metadata includes information indicating detection statuses of the detection units 126, 127 (detection status) and information concerning a moving object and a non-moving object detected in the detection units 126, 127 (the number of objects, object information and the like). Therefore, the surveillance apparatus 104 can recognize detection statuses ("during detection", "acquiring a background", "during PTZ operation", "video abnormality", "equipment abnormality" and the like) in the detection units 126, 127 of the surveillance camera 102 (102a, 102b), and also can perform subsequent processing, for example, processing of OSD-displaying the detection status on the monitor 169 as described above.

Additionally, the surveillance apparatus 104 can process picture data corresponding to a period during which the detection units 126, 127 stops the detection (for example, periods of "video abnormality", "equipment abnormality" and the like) based on information indicating detection statuses of the detection units 126, 127, and can perform processing of detecting a moving object or a non-moving object. The detection processing and the above display processing are performed by the control unit 161. In this case, the control unit 161 includes a data processing unit.

Figure 13A:
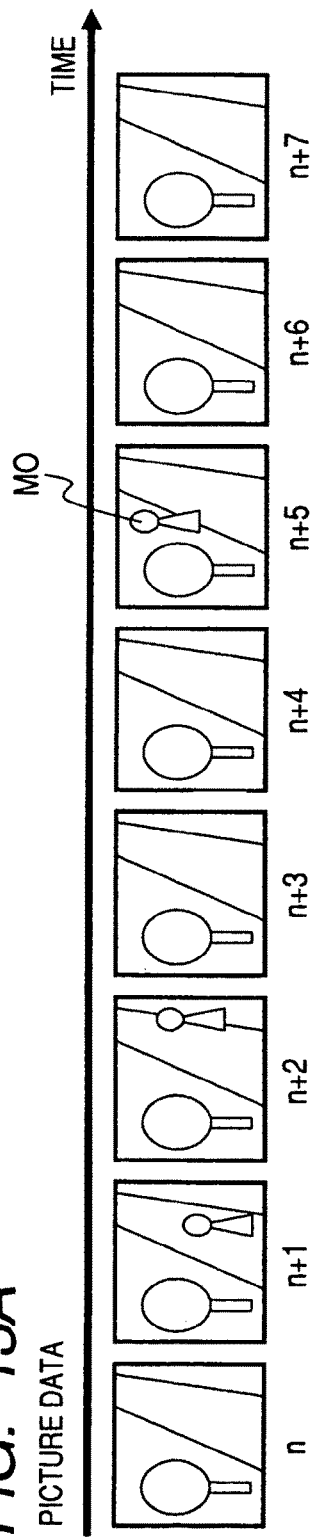
FIG. 13A and FIG. 13B are block diagrams showing examples of picture data and detection information of a moving object which are transmitted from a surveillance camera to a surveillance apparatus and recorded therein.
Figure 13B:
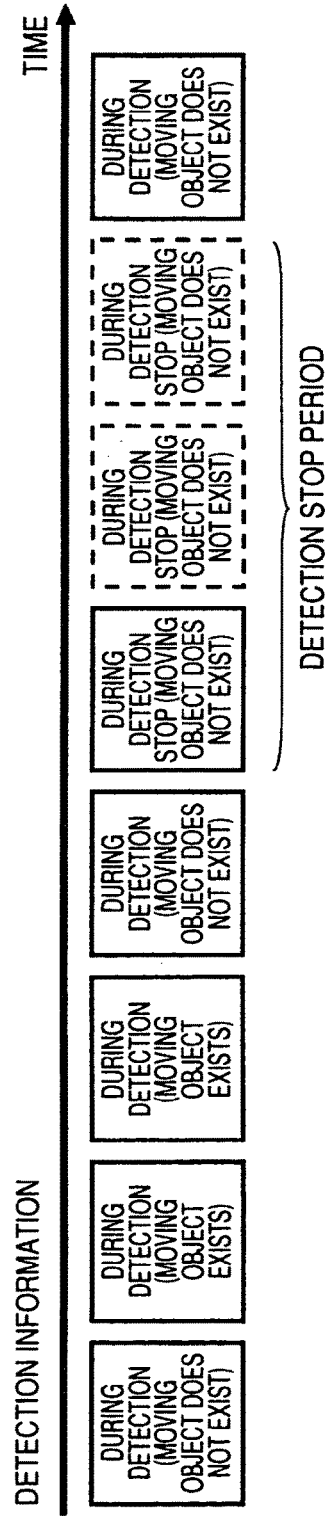

FIG. 13A and FIG. 13B are views showing an example of picture data and detection information of a moving object transmitted from the surveillance camera 102 to the surveillance apparatus 104 to be recorded therein.

In the nth frame, a moving picture is not detected by moving detection, and metadata including a detection status indicating "during detection" and information indicating that a moving object does not exist (the number of objects indicates "0" and there is no object information) is transmitted from the surveillance camera 102 to the surveillance apparatus 104 to be recorded. In the n+1th frame, the n+2th frame, a moving object is detected by moving object detection, and metadata including the detection status indicating "during detection" and information indicating that a moving object exists (the number of objects indicates the number of 1 or more and there is information corresponding to the number of objects) is transmitted from the surveillance camera 102 to the surveillance apparatus 104 to be recorded.

In the n+3th frame, a moving object is not detected by moving object detection, and metadata including the detection status indicating "during detection" and information indicating that a moving object does not exist is transmitted from the surveillance camera 102 to the surveillance apparatus 104 to be recorded. In the n+4th frame to n+6th frame, moving object detection is stopped by some reason, and metadata including a detection status indicating "during detection stop" ("during acquiring a background", "during PTZ operation", "video abnormality", "equipment abnormality" and the like) and information including that a moving object does not exist is transmitted and recorded only at the n+4th frame. In the n+7th frame, moving object detection is started again, however, a moving object is not detected by the moving object detection, therefore, metadata including the detection status indicating "during detection" and information indicating that a moving object does not exist is transmitted from the surveillance camera 102 to the surveillance apparatus 104 to be recorded therein.

In the case that the moving object detection is stopped by some reason in the detection unit 126 of the surveillance camera 102 as described above, metadata including the detection status indicating "during detection stop" is transmitted from the surveillance camera 102 to the surveillance apparatus 104 to be recorded at the first frame of the stopped period. Therefore, the surveillance apparatus 104 can specify picture data corresponding to the period in which moving detection is stopped by using the detection status (information indicating the detection status of the detection unit) included in metadata, and can perform detection processing of the moving object by processing the picture data. In this case, when a moving object MO exists in the n+5th frame in the detection stop period, the moving object MO can be detected by detection processing on the side of the surveillance apparatus 104.

In the above embodiment, as the processing using the detection statuses (information indicating detection statuses of the detection unit) included in metadata transmitted from the surveillance camera 102 on the side of the surveillance apparatus 104, processing of OSD-displaying detection statuses on the pictures, and processing of detecting a moving picture or a non-moving picture from the picture data in the detection stop period have been described, however, processing using the detection statuses is not limited to them. As other processing, for example, when the surveillance camera transmitting picture data and metadata to the surveillance apparatus is in the detection stop status by some reason, it is possible to perform processing of switching the camera so that picture data and metadata is transmitted from another camera by using the detection statuses.

The invention can be applied to, for example, a surveillance camera apparatus which transmits picture data and metadata including information concerning the detected moving object or non-moving object from the surveillance camera to the surveillance apparatus connected through the network.

It should be understood by those skilled in the art that various modifications, combinations, sub-combinations and alterations may occur depending on design requirements and other factors insofar as they are within the scope of the appended claims or the equivalents thereof.

What is claimed is:

1. Network equipment which is connected to other network equipment through a network, the network equipment comprising:
   a processor that controls operation of:
   a moving object detection unit processing picture data representing a plurality of picture frames taken by an imaging unit to detect whether a moving object is present in one or more of the picture frames,
   a non-moving object detection unit processing the picture data to detect whether a non-moving object is present in one or more of the picture frames,
   a metadata generation unit generating metadata associated with a given picture frame including:
   moving object detection status information having a particular value when indicating that the moving object detection unit was in a state in which moving object detection is carried out and having at least one other value when indicating that the moving object detection unit was in a corresponding state in which moving object detection is not carried out,
   information concerning the moving object when detected,
   non-moving object detection status information having a given value when indicating that the non-moving object detection unit was in a state in which non-moving object detection is carried out and having at least one further value when indicating that the non-moving object detection unit was in a corresponding further state in which non-moving object detection is not carried out, and
   information concerning the non-moving object when detected, and
   a data transmission unit transmitting the picture data and the metadata generated in the metadata generation unit to the other network equipment,
   wherein when the moving object detection status information, the information concerning the moving object, the non-moving object detection status information, and the information concerning the non-moving object do not vary over a plurality of frames, the data transmission unit only transmits the metadata associated with a first one of the plurality of frames and does not transmit the metadata associated with remaining ones of the plurality of frames,
   wherein the moving and non-moving detection status information are used to control processing of detecting at least one of a moving object and a non-moving object, and
   wherein a monitoring device, which receives the picture data and the metadata, controls a display to display camera status based on the moving and non-moving detection status information, in which the camera status is determined according to camera operations including acquiring a background and during pan, tilt, zoom (PTZ) operation.

2. The network equipment according to claim 1, wherein the processor further controls operation of:
   a picture data generation unit taking surveillance pictures and generating the picture data representing the plurality of picture frames corresponding to the surveillance pictures, and
   wherein the moving object detection unit and the non-moving object detection unit process the picture data generated in the picture data generation unit and detect the moving object or the non-moving object.

3. The network equipment according to claim 1, wherein the at least one other value of the moving object detection status information when indicating that the moving object detection unit was in the corresponding state in which moving object detection is not carried out is determined according to camera operational states including a background acquiring state, a pan, tilt, zoom (PTZ) operation state, a video abnormality state, and an equipment abnormality state.

4. The network equipment according to claim 1, wherein the at least one further value of the non-moving object detection status information when indicating that the non-moving object detection unit was in the corresponding further state in which non-moving object detection is not carried out is determined according to camera operational states including a background acquiring state, a pan, tilt, zoom (PTZ) operation state, a video abnormality state, and an equipment abnormality state.

5. The network equipment of claim 1, wherein the camera status is controlled to be displayed, with one or more surveillance pictures corresponding to one or more of the plurality of picture frames, indicating association respectively with the one or more surveillance pictures, according to the moving and non-moving detection status corresponding to the one or more surveillance pictures.

6. Network equipment which is connected to other network equipment through a network, the network equipment comprising:
- a processor that controls operation of:
- a data receiving unit receiving picture data representing a plurality of picture frames taken by an imaging unit of the other network equipment and metadata transmitted from the other network equipment,
- a data recording unit recording picture data and metadata received in the data receiving unit,
- wherein the metadata associated with a given picture frame includes:
- moving object detection status information having a particular value when indicating that a moving object detection unit of the other network equipment was in a state in which detection is carried out and having at least one other value when indicating that the moving object detection unit was in a corresponding state in which moving object detection is not carried out,
- non-moving object detection status information having a given value when indicating that a non-moving object detection unit of the other network equipment was in a state in which detection is carried out and having at least one further value when indicating that the non-moving object detection unit was in a corresponding further state in which non-moving object detection is not carried out,
- information concerning a moving object when detected, and
- information concerning a non-moving object when detected, and
- a data processing unit performing processing using the moving object detection status information and the non-moving object detection status information,
- wherein when the moving object detection status information, the information concerning the moving object, the non-moving object detection status information, and the information concerning the non-moving object do not vary over a plurality of frames, the data receiving unit only receives the metadata associated with a first one of the plurality of frames and does not receives the metadata associated with remaining ones of the plurality of frames,
- wherein the moving and non-moving detection status information are used to control processing of detecting at least one of a moving object and a non-moving object, and
- a monitoring unit, which receives the picture data and the metadata, to control a display to display camera status based on the moving and non-moving detection status information, in which the camera status is determined according to camera operations including acquiring a background and during pan, tilt, zoom (PTZ) operation.

7. The network equipment according to claim 6, wherein the data processing unit processes the picture data corresponding to a period during which the detection unit of the other network equipment stops the detection and performs processing of detecting a moving object or a non-moving object using the moving object detection status information and the non-moving object detection status information.

8. The network equipment according to claim 6, wherein the data processing unit performs processing of displaying detection statuses of the detection unit to correspond to pictures according to the picture data using the moving object detection status information and the non-moving object detection status information.

9. The network equipment according to claim 6, wherein the at least one other value of the moving object detection status information when indicating that the moving object detection unit was in the corresponding state in which moving object detection is not carried out is determined according to camera operational states including a background acquiring state, a pan, tilt, zoom (PTZ) operation state, a video abnormality state, and an equipment abnormality state.

10. The network equipment according to claim 6, wherein the at least one further value of the non-moving object detection status information when indicating that the non-moving object detection unit was in the corresponding further state in which non-moving object detection is not carried out is determined according to camera operational states including a background acquiring state, a pan, tilt, zoom (PTZ) operation state, a video abnormality state, and an equipment abnormality state.

11. A network system, comprising:
- first network equipment; and
- second network equipment connected through a network to the first network equipment;
- the first network equipment including:
- a moving object detection unit processing picture data representing a plurality of picture frames taken by an imaging unit to detect whether a moving object is present in one or more of the picture frames,
- a non-moving object detection unit processing the picture data to detect whether a non-moving object is present in one or more of the picture frames,
- a metadata generation unit generating metadata associated with a given picture frame including:
- moving object detection status information having a particular value when indicating that the moving object detection unit was in a state in which moving object detection is carried out and having at least one other value when indicating that the moving object detection unit was in a corresponding state in which moving object detection is not carried out,
- information concerning the moving object when detected,
- non-moving object detection status information having a given value when indicating that the non-moving object detection unit was in a state in which non-moving object detection is carried out and having at least one further value when indicating that the non-moving object detection unit was in a corresponding further state in which non-moving object detection is not carried out, and
- information concerning the non-moving object when detected, and
- a data transmission unit transmitting the picture data and metadata generated in the metadata generation unit to the second network equipment,
- wherein when the moving object detection status information, the information concerning the moving object, the non-moving object detection status information, and the information concerning the non-moving object do not vary over a plurality of frames, the data transmission unit only transmits the metadata associated with a first one of the plurality of frames and does not transmit the metadata associated with remaining ones of the plurality of frames; and
- the second network equipment including:
- a data receiving unit receiving picture data and metadata transmitted from the first network equipment,
- a data recording unit recording picture data and metadata received in the data receiving unit, a data processing unit performing processing of detecting a moving object or a non-moving object using the moving object detection status information and the non-moving object detection status information, and a monitoring device, which receives the picture data and the metadata, configured to control a display to display camera status based on the moving and non-moving detection status information, in which the camera status is determined according to camera operations including acquiring a background and during pan, tilt, zoom (PTZ) operation.

12. The network system according to claim 11, wherein the at least one other value of the moving object detection status information when indicating that the moving object detection unit was in the corresponding state in which moving object detection is not carried out is determined according to camera operational states including a background acquiring state, a pan, tilt, zoom (PTZ) operation state, a video abnormality state, and an equipment abnormality state.

13. The network system according to claim 11, wherein the at least one further value of the non-moving object detection status information when indicating that the non-moving object detection unit was in the corresponding further state in which non-moving object detection is not carried out is determined according to camera operational states including a background acquiring state, a pan, tilt, zoom (PTZ) operation state, a video abnormality state, and an equipment abnormality state.

14. A surveillance camera system, comprising:
a surveillance camera; and
a surveillance apparatus connected through a network to the surveillance camera;
the surveillance camera including:
a picture data generation unit taking surveillance pictures and generating picture data representing a plurality of picture frames corresponding to the surveillance pictures,
a moving object detection unit processing picture data generated in the picture data generation unit to detect whether a moving object is present in one or more of the picture frames,
a non-moving object detection unit processing the picture data to detect whether a non-moving object is present in one or more of the picture frames,
a metadata generation unit generating metadata associated with a given picture frame including:
moving object detection status information having a particular value when indicating that the moving object detection unit was in a state in which moving object detection is carried out and having at least one other value when indicating that the moving object detection unit was in a corresponding state in which moving object detection is not carried out,
information concerning the moving object when detected,
non-moving object detection status information having a given value when indicating that the non-moving object detection unit was in a state in which non-moving object detection is carried out and having at least one further value when indicating that the non-moving object detection unit was in a corresponding further state in which non-moving object detection is not carried out, and
information concerning the non-moving object when detected, and a transmission unit transmitting the picture data generated in the picture data generation unit and the metadata generated in the metadata generation unit to the surveillance apparatus, wherein the metadata is used to control the display unit to display processing status information of at least one of moving object detection, non-moving object detection and one or more processing results, wherein when the moving object detection status information, the information concerning the moving object, the non-moving object detection status information, and the information concerning the non-moving object do not vary over a plurality of frames, the data transmission unit only transmits the metadata associated with a first one of the plurality of frames and does not transmit the metadata associated with remaining ones of the plurality of frames; and the surveillance apparatus including:
a data receiving unit receiving picture data and metadata transmitted from the surveillance camera,
a data recording unit recording picture data and metadata received in the data receiving unit,
a data processing unit performing processing of detecting a moving object or a non-moving object using the moving object detection status information and the non-moving object detection status information, and
a monitoring device, which receives the picture data and the metadata, configured to control a display to display camera status based on the moving and non-moving detection status information, in which the camera status is determined according to camera operations including acquiring a background and during pan, tilt, zoom (PTZ) operation.

15. The surveillance camera system according to claim 14, wherein the at least one other value of the moving object detection status information when indicating that the moving object detection unit was in the corresponding state in which moving object detection is not carried out is determined according to camera operational states including w a background acquiring state, a pan, tilt, zoom (PTZ) operation state, a video abnormality state, and an equipment abnormality state.

16. The surveillance camera system according to claim 14, wherein the at least one further value of the non-moving object detection status information when indicating that the non-moving object detection unit was in the corresponding further state in which non-moving object detection is not carried out is determined according to camera operational states including a background acquiring state, a pan, tilt, zoom (PTZ) operation state, a video abnormality state, and an equipment abnormality state.

17. An image signal processing apparatus comprising:
a picture data generation unit configured to take pictures and generating picture data representing a plurality of picture frames;
a moving object detection unit configured to process picture data generated in the picture data generation unit to detect whether a moving object is present in one or more of the picture frames, or a non-moving object detection unit configured to process the picture data to detect whether a non-moving object is present in one or more of the picture frames;
a metadata generation unit generating metadata associated with a given picture frame including:
moving object detection status information having a particular value when indicating that the moving object detection unit was in a state in which moving object detection is carried out and having at least one other value when indicating that the moving object detection unit was in a corresponding state in which moving object detection is not carried out, or non-moving object detection status information having a particular value when indicating that the non-moving object detection unit was in a state in which non-moving object detection is carried out and having at least one other value when indicating that the non-moving object detection unit was in a corresponding state in which non-moving object detection is not carried out;

information concerning the moving object when detected, or information concerning the non-moving object when detected; and status information indicating at least one of a detecting state, a background acquiring state, a pan-tilt-zoom (PTZ) operation state, a video abnormality state, and an equipment abnormality state; and a transmission unit configured to transmit picture data generated in the picture data generation unit and the metadata, wherein a background acquiring state indicates that a background acquiring process is proceeded in the moving object detection unit or/and the non-moving object, wherein a pan-tilt-zoom (PTZ) operation state indicates the camera is under panning process, tilting process or zooming process, wherein the transmitted metadata have no information about a detected moving object or a detected non-moving object in the status information indicating at least one of a background acquiring state, a pan-tilt-zoom (PTZ) operation state, a video abnormality state, and an equipment abnormality state, and wherein a monitoring device, which receives the picture data and the metadata, controls a display to display camera status based on the moving and non-moving detection status information, in which the camera status is determined according to camera operations including acquiring a background and during pan, tilt, zoom (PTZ) operation.

18. The image signal processing apparatus according to claim 17, wherein the moving object detection unit does not detect whether a moving object is present in one or more of the picture frames in the status information determined according to states including a background acquiring state, a pan-tilt-zoom (PTZ) operation state, a video abnormality state, and an equipment abnormality state.

19. The image signal processing apparatus according to claim 17, wherein the non-moving object detection unit does not detect whether a non-moving object is present in one or more of the picture frames in the status information determined according to states including a background acquiring state, a pan-tilt-zoom (PTZ) operation state, a video abnormality state, and an equipment abnormality state.

20. The image signal processing apparatus according to claim 17,
wherein the image signal processing apparatus is used in a surveillance system, and
wherein the surveillance apparatus receives the transmitted metadata and controls a display to display information about the status information in the received metadata.

21. The image signal processing apparatus according to claim 17,
wherein the image signal processing apparatus is used in a surveillance system, and
wherein the surveillance apparatus receives the transmitted metadata and the transmitted pictured data, and processes the picture data to detect whether a moving object is present in one or more of the picture frames, or to detect whether a non-moving object is present in one or more of the picture frames.

* * * * *